(12) United States Patent
Frisk et al.

(10) Patent No.: US 7,713,373 B2
(45) Date of Patent: May 11, 2010

(54) PROCESS FOR PRODUCING PACKAGING LAMINATE MATERIAL

(75) Inventors: Peter Frisk, Tokyo (JP); Yoshio Ohmoto, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 776 days.

(21) Appl. No.: 10/553,673

(22) PCT Filed: Dec. 4, 2003

(86) PCT No.: PCT/JP03/15518

§ 371 (c)(1),
(2), (4) Date: Jan. 26, 2007

(87) PCT Pub. No.: WO2004/094138

PCT Pub. Date: Nov. 4, 2004

(65) Prior Publication Data

US 2007/0144666 A1   Jun. 28, 2007

(30) Foreign Application Priority Data

Apr. 18, 2003  (JP) .............................. 2003-113753

(51) Int. Cl.
| B32B 37/00 | (2006.01) |
| B32B 38/14 | (2006.01) |
| B29C 65/00 | (2006.01) |
| B32B 15/04 | (2006.01) |
| B32B 15/20 | (2006.01) |
| B32B 33/00 | (2006.01) |
| G03B 21/28 | (2006.01) |

(52) U.S. Cl. ................. 156/277; 156/308.2; 156/309.6; 53/410; 53/477; 53/DIG. 2; 206/524.1; 206/524.3

(58) Field of Classification Search ................. 156/277, 156/308.2, 309.6; 53/410, 416, 477, DIG. 2; 206/524.1, 524.3

See application file for complete search history.

(56) References Cited

U.S. PATENT DOCUMENTS

| 4,264,668 | A | * | 4/1981 | Balla ........................ 428/195.1 |
| 5,112,466 | A | * | 5/1992 | Ohta et al. ............. 204/298.05 |
| 5,254,363 | A | * | 10/1993 | Kita et al. ................ 427/126.3 |
| 5,378,506 | A | * | 1/1995 | Imai et al. ................... 427/529 |
| 5,421,890 | A | * | 6/1995 | Kita et al. ................... 118/719 |
| 5,686,151 | A | * | 11/1997 | Imai et al. ................... 427/576 |
| 5,756,207 | A | * | 5/1998 | Clough et al. ............... 428/375 |
| 5,879,811 | A | * | 3/1999 | Tanaka et al. ............... 428/428 |
| 6,146,135 | A | * | 11/2000 | Watanabe et al. ........... 432/221 |
| 6,451,391 | B1 | * | 9/2002 | Yamada et al. ............... 427/586 |
| 6,451,450 | B1 | * | 9/2002 | Goyal et al. ................. 428/629 |
| 6,524,719 | B1 | * | 2/2003 | Yamane et al. ........... 428/474.7 |
| 6,656,602 | B1 | * | 12/2003 | Ishikawa et al. ............. 428/522 |
| 6,673,387 | B1 | * | 1/2004 | Zhang et al. ................... 427/62 |
| 6,720,097 | B2 | * | 4/2004 | Ohkawa et al. ............. 428/701 |
| 6,790,677 | B2 | * | 9/2004 | Yamawaki ..................... 438/3 |
| 6,797,338 | B2 | * | 9/2004 | Saitoh et al. ................. 427/561 |
| 6,949,478 | B2 | * | 9/2005 | Ohmi et al. .................. 438/774 |
| 7,033,679 | B2 | * | 4/2006 | Okura et al. ................. 428/687 |
| 7,192,625 | B2 | * | 3/2007 | Ohkawa et al. ........ 427/255.29 |
| 7,309,740 | B2 | * | 12/2007 | Masuda et al. ............... 525/240 |
| 2001/0036551 | A1 | * | 11/2001 | Yamane et al. ............... 428/409 |
| 2002/0013487 | A1 | * | 1/2002 | Norman et al. ................. 556/7 |
| 2002/0015790 | A1 | * | 2/2002 | Baum et al. ............. 427/255.28 |
| 2002/0126265 | A1 | * | 9/2002 | Okura et al. ................... 353/98 |
| 2002/0132048 | A1 | * | 9/2002 | Baum et al. ............. 427/255.28 |
| 2003/0186032 | A1 | * | 10/2003 | Rosenberger et al. .... 428/195.1 |

FOREIGN PATENT DOCUMENTS

| JP | 63-222 B2 | 1/1988 |
| JP | 2-147326 | 6/1990 |
| JP | 2-180105 | 7/1990 |
| JP | 4-19139 | 1/1992 |
| JP | 11-29110 | 2/1999 |
| JP | 2002337262 A | * 11/2002 |
| JP | 2009154924 A | * 7/2009 |

OTHER PUBLICATIONS

English Abstract of JP 2002-337262.*
English Abstract of JP 2009-154924.*

* cited by examiner

*Primary Examiner*—Philip C Tucker
*Assistant Examiner*—Sing P Chan
(74) *Attorney, Agent, or Firm*—Buchanan Ingersoll & Rooney PC

(57) ABSTRACT

A process for producing a web-like laminate material for packaging container composed of a base layer and a thermally sealable inner layer, comprising: introducing an oxygen-containing gas in a silver vapor atmosphere; carrying a web-like base film in the silver vapor atmosphere to form a thin film of metallic silver on a surface of the web-like base film; oxidizing the thin film into a thin film of silver oxide; drawing out the base film provided with the thin film of silver oxide from the silver vapor atmosphere to obtain a web-like base layer; laminating an inner face of the web-like base layer with a thermally sealable inner layer, printing a container design on an outer face of the web-like base layer; and forming a thermoplastic layer or a support layer on the outer face and inner face of the web-like base layer. A seal zone, vicinity thereof and entirety of the container can be formed in an antibacterial atmosphere or with an antibacterial material.

11 Claims, No Drawings

PROCESS FOR PRODUCING PACKAGING LAMINATE MATERIAL

TECHNICAL FIELD

The present invention relates to a process for producing a packaging laminate material which is heat-sealed by high-frequency induction heating for forming a container and is excellent in antibacterial activity.

BACKGROUND ART

In a packaging container used for milk, juice, sake, shochu, mineral water and other beverages, for example, a web-like laminate material provided with a crease line on a fibrous base material (e.g. paper or the like)/a plastic laminate body is formed into a tube shape by providing with a longitudinal vertical line seal, a packaging material formed into the tube shape is filled with a material to be filled, and a lateral line seal is provided in a transverse direction of a tubular packaging material to form a cushion shape and fold along the crease line, thus a final shape is formed. As the final shape, there is a brick shape (parallelepiped), a tetrahedral shape or the like.

In the above-described packaging system, with respect to aseptic packaging and chilled packaging having a different packaging system, a different web-like laminate material for the packaging container is used. In a laminate packaging material used for a paper packaging container product, as the aseptic packaging, low density polyethylene (LDPE)/printing ink layer/paper core layer (fibrous carrier layer)/LDPE/aluminum foil/LDPE/LDPE and LDPE/printing ink layer/paper core layer/LDPE/aluminum foil/polyester (PET) are known, whereas as the chilled packaging, LDPE/printing ink layer/paper core layer/LDPE/LDPE, printing ink layer/LDPE/paper core layer/LDPE/LDPE and others are known.

In a laminate material to be heat-sealed by high-frequency induction heating for forming a container, there is known the laminate material described in Japanese Examined Patent Publication No. S63-222, for example, which is a web-like laminate material for a packaging container composed of a base layer and a thermoplastic inner layer, and includes an electrically conductive layer of carbon black laminated between the base layer and a thermoplastic innermost layer in a zone to be heat-sealed by the high-frequency induction heating for forming the container. The laminate material is composed of the base layer, the thermoplastic innermost layer and the electrically conductive layer of carbon black which is the intermediate layer thereof (Japanese Examined Patent Publication No. S63-222).

When the web-like laminate material for the packaging container is overlaid and a thermally sealable innermost layer is melted to form the zone to be sealed, there is a possibility that a liquid food product or the like to be filled and packaged remains in a seal zone and in the vicinity thereof. Further, there is a possibility that a residue is contaminated with bacteria or the like from the exterior. Therefore, it is necessary that a seal zone and vicinity thereof be formed in an antibacterial atmosphere or with an antibacterial material.

A packaging paper container of the liquid food product is classified into the aseptic packaging capable of preserving at a normal temperature and the chilled packaging to be distributed in a chilled condition such as a milk container or the like. Every packaging laminate material is roughly separated into the aseptic packaging and the chilled packaging, and produced. The liquid food product is filled and packaged by a separate package filling machine and a separate sealing method.

However, even if the aseptic packaging and the chilled packaging include a different packaging system, if a part of the different packaging system is diverted or appropriated, efficient operation/application/work of entirety of packaging system can be carried out to thereby further contribute to reduced energy, materials and production costs.

DISCLOSURE OF INVENTION

It is an object of the present invention to provide a process for producing a packaging laminate material for the purpose of solving the problem described above.

The present invention for solving this problem is directed to a process for producing a web-like laminate material for a packaging container composed of a base layer and a thermally sealable inner layer, and constitutes the steps of introducing an oxygen-containing gas into a silver vapor atmosphere, carrying a web-like base film in the silver vapor atmosphere so as to form a thin film of metallic silver on a surface of the web-like base film, oxidizing the thin film of metallic silver into a thin film of silver oxide, drawing out the base film provided with the thin film of silver oxide from the silver vapor atmosphere to thereby obtain a wablike base layer, laminating an inner face of the web-like base layer with the thermally sealable inner layer, printing a container design on an outer face of the web-like base layer, and forming a thermoplastic layer or a support layer on the outer face and inner face of the web-like base layer.

As the result, formation of a seal zone, vicinity thereof and entirety of container can be carried out in an antibacterial atmosphere or with an antibacterial material. Further, even if aseptic packaging and chilled packaging includes a different packaging system, a part of the different packaging system can be diverted or appropriated. Therefore, efficient operation/application/work of entirety of packaging system can be performed to thereby further contribute to reduced energy, materials and production costs.

In a first aspect of the present invention, a process for producing a packaging laminate material is directed to the process for producing at least a web-like laminate material for a packaging container composed of a base layer and a thermally sealable inner layer and includes a configuration characterized by heating metallic silver to form a silver vapor atmosphere, when or after an oxygen-containing gas is introduced into the silver vapor atmosphere, carrying a web-like base film continuously or intermittently in the silver vapor atmosphere so as to form a thin film of metallic silver on a surface of the web-like base film, oxidizing part/entirety of metallic silver simultaneously or subsequently into silver oxide by the oxygen-containing gas to convert into a thin film of silver oxide, drawing out the web-like base film provided with the thin film of silver oxide from the silver vapor atmosphere containing the oxygen-containing gas to thereby obtain a wablike base layer, laminating an inner face of the inside of the web-like base layer with a thermally sealable inner layer, printing a container design indirectly or directly on an outer face of the outside of the web-like base layer, and forming simultaneously or successively, the same kind of or a different kind of, and the singular number of or a plurality of thermoplastic layers or support layers on the outer face and inner face of the web-like base layer.

In a second aspect of the present invention, in a process for producing a packaging laminate material, a thin film of silver oxide is a composite of metallic silver and silver oxide.

In a third aspect of the present invention, in a process for producing a packaging laminate material, an oxygen-containing gas is a mixed gas of an inert gas and an oxygen gas.

In a fourth aspect of the present invention, in a process for producing a packaging laminate material, a film thickness of a thin film of silver oxide is less than 10 μm.

In a fifth aspect of the present invention, in a process for producing a packaging laminate material, a film thickness of a thin film of silver oxide is 0.1 to 1 μm.

In a sixth aspect of the present invention, in a process for producing a packaging laminate material, a web-like base film includes one kind, or two or more kinds of barrier films of a silicon oxide film, an aluminum oxide film or/and a rigid carbon film formed on at least one surface.

In a seventh aspect of the present invention, in a process for producing a packaging laminate material, a web-like base film is composed of a polymer of one kind, or two kinds or more selected from the group consisting of low density polyethylene, linear low density polyethylene, linear low density polyethylene produced by a metallocene catalyst medium-density polyethylene, high density polyethylene, polypropylene, poly(ethylene naphthalate), ethylene vinyl alcohol, polyamide, a polycondensate of metaxylenediamine and adipic acid, polyvinyl alcohol, an ethylene-vinyl acetate copolymer, an ethylene-methacrylic acid copolymer, an ethylene-ethyl acrylate copolymer, an ethylene-methyl acrylate copolymer, an ethylene-acrylic acid copolymer and a cyclic olefin copolymer, paper, or a laminate body of the polymer and the paper.

This invention having the above-described configuration includes the following function:

A web-like laminate material for a packaging container of the present invention is a long and bandlike (web-like) so as to allow a number of containers to be formed. Therefore, the packaging container can be filled and produced continuously and at high speed.

According to the present invention, a support layer or a base layer if the support layer is not present, provides physical and mechanical strength to a packaging container and a laminate material, and maintains and supports the shape configuration thereof or the like. A thermoplastic inner layer is also an innermost layer or an innermost adjacent layer of the wall of a container, and is brought into contact with a liquid food product directly or indirectly in close proximity thereto, thus penetration/wetting of a liquid to the base layer of the container is prevented. Further, the inner layer thereof is thermally melted and softened to form a seal zone in a heat seal.

A thin film of silver oxide is a thin film layer formed on an inner face of the inside of the base layer containing a zone to be heat-sealed by high-frequency induction heating for forming a container.

Since the thin film of silver oxide is provided with electrical conductivity, when a high frequency current is flown into an external coil, an induced current is generated in an electrically conductive layer by high-frequency induction, and a plastic (thermoplastic material/resin) of an adjacent inner layer is melted by heat due to the resistance thereof and sealing is carried out. That is, according to this invention, when the container is formed, the electrically conductive layer is subjected to induction heating by the high-frequency induction heating, the generated heat is transferred to the innermost layer, and a thermally sealable innermost layer is heated, melted and softened. At the heated area thereof, a heat seal zone is formed.

A process for producing a packaging laminate material of this invention is directed to the process for producing at least a web-like laminate material for a packaging container composed of a base layer and a thermally sealable inner layer including the following processes:

A) A Process for Heating Metallic Silver to Form a Silver Vapor Atmosphere

In this process, for example, solid metallic silver is heated in a vacuum chamber. As a heating method, there are, for example, induction heating, sputtering, Joule heat by electrical conduction, and other methods. The solid metallic silver melts and liquefies by heating, and further evaporates in a vacuum to generate a silver vapor. This vapor forms a silver vapor atmosphere.

B) A Process for Carrying a Web-Like Base Film Continuously or Intermittently in a Silver Vapor Atmosphere so as to Form a thin Film of Metallic Silver on a Surface of the Web-Like Base Film when or after an Oxygen-Containing Gas is Introduced into the Silver Vapor Atmosphere In this process, the oxygen-containing gas is continuously or intermittently introduced into the silver vapor atmosphere in a control manner. The oxygen-containing gas is a mixed gas of an inert gas, for example, such as argon, helium, neon, nitrogen or the like and an oxygen gas, and preferably a mixed gas is an argon gas and an oxygen gas. By this mixing, more controllable oxidation can be achieved.

C) A Process for Oxidizing Part/Entirety of Metallic Silver Simultaneously or Subsequently into Silver Oxide by an Oxygen-Containing Gas to Convert into a thin Film of Silver Oxide This invention is characterized by converting a thin film of metallic silver into the thin film of silver oxide while controlling oxidation. A parameter to be controlled includes an ambient temperature, a ratio of the mixed gas, a continuous or intermittent carrying speed of the web-like base film and others.

D) A Process for Drawing out a Web-Like Base Film Provided with a thin Film of Silver Oxide from a Silver Vapor Atmosphere Having an Oxygen-Containing Gas to Thereby Obtain a Web-like Base Layer The web-like base film to be continuously carried is drawn out from the inside of the silver vapor atmosphere. The obtained wablike base layer can immediately be used in the next downstream process. Also, the base material can also be stored by temporarily winding in a roll shape.

E) A Process for Laminating an Inner Face of the Inside of a Web-Like Base Layer with a Thermally Sealable Inner Layer In this process, the inner face of the inside of the web-like base layer is indirectly or directly laminated with the thermally sealable inner layer. The thermally sealable inner layer includes polyolefin, for example, such as various kinds of low density polyethylene or the like, and others.

F) A Process for Indirectly or Directly Printing a Container Design on an Outer Face of the Outside of the Web-Like Base Layer G) A Process for Forming Simultaneously or Successively, the same Kind of or a Different Kind of, and the Singular Number of or a Plurality of Thermoplastic Layers and/or Support Layers on the Outer Face and Inner Face of the Web-Like Base Layer In these processes, the printing is carried out on the outside of the web-like base layer through the thermoplastic layer and/or the support layer, or directly. Further, a printing face can be laminated with the singular number of or a plurality of thermoplastic layers.

In this process, the thermoplastic layer includes an intermediate layer of polyolefin or the like, an adhesive resin layer, a gas barrier layer or the like. Also, as the support layer, there is a paper layer, a composite layer mainly composed of paper, a plastic composite layer or the like.

In a preferred embodiment of this invention, the thin film of silver oxide is a composite of metallic silver and silver oxide.

By adopting this composite, a thermally sealable material can directly be heated to thereby allow effective heating and sealing. Further, owing to pressing during heat sealing, a silver component (metallic silver, silver ion, silver oxide or the like) discontinuously and also entirely covers the seal zone, and by this silver component, formation of the seal zone and vicinity thereof can be carried out in an antibacterial atmosphere or with an antibacterial material.

In a preferred embodiment of this invention, an oxygen-containing gas is a mixed gas of an inert gas and an oxygen gas.

By this mixing, more controllable oxidation can be achieved, and while controlling the oxidation, a thin film of metallic silver is converted into a thin film of silver oxide.

In a preferred embodiment of this invention, a film thickness of a thin film of silver oxide is less than 10 µm, and more preferably 0.1 to 1 µm.

By the above-described film thickness, effective heating of a heat seal and formation of an antibacterial atmosphere can be carried out.

In a preferred embodiment of this invention, a web-like base film includes one kind of, or two or more kinds of barrier layers of a silicon oxide film, an aluminum oxide film or/and a rigid carbon film formed on at least one surface.

By adding a layer with barrier property, gas barrier property and fragrance protective property can be enhanced.

In a preferred embodiment of this invention, a web-like base film is composed of a polymer of one kind, or two kinds or more selected from the group consisting of low density polyethylene, linear low density polyethylene, linear low density polyethylene produced by a metallocene catalyst, medium-density polyethylene, high density polyethylene, polypropylene, poly(ethylene naphthalate), ethylene vinyl alcohol, polyamide, a polycondensate of metaxylenediamine and adipic acid, polyvinyl alcohol, an ethylene-vinyl acetate copolymer, an ethylene-methacrylic acid copolymer, an ethylene-ethyl acrylate copolymer, an ethylene-methyl acrylate copolymer, an ethylene-acrylic acid copolymer and a cyclic olefin copolymer, paper, or a laminate body of the polymer and the paper.

In a heat seal using a laminate material of this invention, a web-like laminate material, which is the laminate material of this invention, that is, the laminate material composed of a base layer and a thermally sealable inner layer and includes a thin film of silver oxide, is prepared so as to transfer the heat generated by induction heating to the inner layer of a heat-sealed zone formed by high-frequency induction heating for forming the container thereof. Normally, the web-like laminate material is wound in a roll shape, stored and carried.

For instance, a roll-shaped web-like laminate material is filled into a package filling machine, and this laminate material is drawn out from a roll and carried in the filling machine. The web-like laminate material being carried is formed into a tube shape while moving downward. A vertical seal is provided in a longitudinal direction of the laminate material, thus this becomes liquid-tight without liquid leakage. When the vertical seal is provided by high-frequency induction heating, a heat seal zone is formed by the high-frequency induction heating.

A liquid food product is filled into this laminate material tube.

In a transverse direction and, preferably, under a liquid surface of the tube which was filled up, the heat seal zone is formed at a predetermined interval by the high-frequency induction heating, and a lateral seal is provided.

Next, the center of the seal zone is cut by a cutter knife or the like to form an individual container and fold along a crease line as required, thus a final shape is formed.

BEST MODE FOR CARRYING OUT THE INVENTION

An embodiment of the present invention will be described bellow.

Embodiment

An example of a layer structure of a web-like base layer will be exemplified below.
base film/thin film of silver oxide
base film/aluminum oxide film/thin film of silver oxide
base film/silicon oxide film/thin film of silver oxide
base film/silicon oxide film and aluminum oxide film/thin film of silver oxide
base film/silicon oxide film and rigid carbon film/thin film of silver oxide
base film/aluminum oxide film/thin film of silver oxide/aluminum oxide film
base film/aluminum oxide film/thin film of silver oxide/silicon oxide film
base film/rigid carbon film/thin film of silver oxide/aluminum oxide film
base film/rigid carbon film/thin film of silver oxide/silicon oxide film
base film/silicon oxide film/thin film of silver oxide/silicon oxide film
base film/silicon oxide film/thin film of silver oxide/aluminum oxide film A film thickness of the above-described example is 1 µm to 100 µm.

An example of a layer structure of a packaging laminate material will be exemplified below.
(outside) polyolefin layer/paper layer/polymer layer/base layer/polyolefin thermally sealable inner layer (inside)
(outside) polyolefin layer/paper layer/polyolefin layer/base layer/adhesive resin layer/polyolefin thermally sealable inner layer (inside)
(outside) base layer/adhesive resin layer/polyolefin thermally sealable inner layer (inside)
(outside) polyolefin layer/adhesive resin layer/base layer/adhesive resin layer/polyolefin thermally sealable inner layer (inside)

More specifically, the following is exemplified:
(outside) low density polyethylene layer/printing layer/paper layer/low density polyethylene layer/PET layer/thin film of silver oxide/adhesive resin layer/low density polyethylene thermally sealable inner layer produced by metallocene catalyst (inside), or the like.

As described above, according to the present invention, the following advantageous effect is obtained:

Entirety of container, in particular a seal zone and vicinity thereof, can be formed in an antibacterial atmosphere or with an antibacterial material.

Even if aseptic packaging and chilled packaging include a different packaging system, since a part of the different packaging system can be diverted or appropriated, efficient operation/application/work of entirety of packaging system can be performed to thereby further allow a contribution to reduced energy, materials and production costs to be made.

According to the present invention, sealing/bonding can be formed by a new sealing method, precise processing is made in a printer during printing at high speed utilizing an automatic bonding apparatus, and a level of mass production can be achieved by a large-scale flexographic printing machine and gravure printing machine.

A process according to the present invention can apply a rapid and secure sealing method to an inexpensive packaging material without including any metal-foil layer.

INDUSTRIAL APPLICABILITY

A process for producing a packaging laminate material of this invention is utilized for packaging containers accommodating a liquid food product such as milk, refreshing drinks or the like.

The invention claimed is:

1. A process for producing a packaging laminate material, the process for producing at least a laminate material web for a packaging container composed of a base layer and a thermally sealable inner layer, comprising the steps of:
   heating metallic silver to form a silver vapor atmosphere;
   carrying a base film web continuously or intermittently in the silver vapor atmosphere so as to form a thin film of metallic silver on a surface of the base film web when or after an oxygen-containing gas is introduced into the silver vapor atmosphere;
   oxidizing a part of or the entirety of the metallic silver simultaneously or subsequently into silver oxide by the oxygen-containing gas to convert into a thin film of silver oxide;
   drawing out the base film web provided with the thin film of silver oxide from the silver vapor atmosphere containing the oxygen-containing gas to thereby obtain a base layer web;
   laminating an inner face of the inside of the base layer web with a thermally sealable inner layer;
   printing a container design indirectly or directly on an outer face of the outside of the base layer web; and
   forming simultaneously or successively at least one thermoplastic layer and or support layer on the outer face and inner face of the base layer web.

2. The process for producing the packaging laminate material according to claim 1, wherein the thin film of silver oxide is a composite of metallic silver and silver oxide.

3. The process for producing the packaging laminate material according to claim 1, wherein the oxygen-containing gas is a mixed gas of an inert gas and an oxygen gas.

4. The process for producing the packaging laminate material according to claim 1, wherein a film thickness of the thin film of silver oxide is less than 10 μm.

5. The process for producing the packaging laminate material according to claim 4, wherein a film thickness of the thin film of silver oxide is 0.1 to 1 μm.

6. The process for producing the packaging laminate material according to claim 1, wherein the base film web includes one kind, or two or more kinds of barrier films of a silicon oxide film, an aluminum oxide film or/and a rigid carbon film formed on at least one surface.

7. The process for producing the packaging laminate material according to claim 1, wherein the base film web is composed of a polymer of one kind, or two kinds or more selected from the group consisting of low density polyethylene, linear low density polyethylene, linear low density polyethylene produced by a metallocene catalyst, medium-density polyethylene, high density polyethylene, polypropylene, poly (ethylene naphthalate), ethylene vinyl alcohol, polyamide, a polycondensate of metaxylenediamine and adipic acid, polyvinyl alcohol, an ethylene-vinyl acetate copolymer, an ethylene-methacrylic acid copolymer, an ethylene-ethyl acrylate copolymer, an ethylene-methyl acrylate copolymer, an ethylene-acrylic acid copolymer and a cyclic olefin copolymer, paper, or a laminate body of the polymer and the paper.

8. The process for producing the packaging laminate material according to claim 1, wherein the forming of the at least one thermoplastic layer and/or support layer on the outer face and inner face of the base layer web comprises forming the same kind of thermoplastic layer and/or support layer on the outer face and inner face of the base layer web.

9. The process for producing the packaging laminate material according to claim 1, wherein the forming of the at least one thermoplastic layer and/or support layer on the outer face and inner face of the base layer web comprises forming a different kind of thermoplastic layer and/or support layer on the outer face and inner face of the base layer web.

10. The process for producing the packaging laminate material according to claim 1, wherein the forming of the at least one thermoplastic layer and/or support layer on the outer face and inner face of the base layer web comprises forming a plurality of thermoplastic layers and/or support layers on the outer face and inner face of the base layer web.

11. The process for producing the packaging laminate material according to claim 1, wherein the forming of the at least one thermoplastic layer and/or support layer on the outer face and inner face of the base layer web comprises forming a single thermoplastic layer and/or support layer on the outer face and inner face of the base layer web.

* * * * *